US011229212B2

(12) United States Patent
Kurschner et al.

(10) Patent No.: US 11,229,212 B2
(45) Date of Patent: Jan. 25, 2022

(54) ROTARY PISTON DEPOSITOR SUPPORTING USER-CONFIGURABLE PRECISION MULTIPLE OUTPUT PORTS

(71) Applicant: Unifiller Systems Inc., Delta (CA)

(72) Inventors: Kuno Kurschner, Delta (CA); Joshua Bradshaw, Surrey (CA)

(73) Assignee: Unifiller Systems, Inc., Delta (CA)

( * ) Notice: Subject to any disclaimer, the term of this patent is extended or adjusted under 35 U.S.C. 154(b) by 110 days.

(21) Appl. No.: 16/325,929

(22) PCT Filed: Aug. 18, 2017

(86) PCT No.: PCT/CA2017/050986
§ 371 (c)(1),
(2) Date: Feb. 15, 2019

(87) PCT Pub. No.: WO2018/032117
PCT Pub. Date: Feb. 22, 2018

(65) Prior Publication Data
US 2019/0208792 A1 Jul. 11, 2019

Related U.S. Application Data

(60) Provisional application No. 62/477,610, filed on Mar. 28, 2017, provisional application No. 62/377,437, filed on Aug. 19, 2016.

(51) Int. Cl.
*A21C 11/18* (2006.01)
*A23L 5/00* (2016.01)
*A23P 30/00* (2016.01)

(52) U.S. Cl.
CPC ............ *A21C 11/18* (2013.01); *A23L 5/00* (2016.08); *A23P 30/00* (2016.08)

(58) Field of Classification Search
CPC . A21C 11/18; A23L 5/00; A23P 30/00; B29C 48/365; B29C 48/475; B29C 48/48;
(Continued)

(56) References Cited

U.S. PATENT DOCUMENTS 4,538,978 A * 9/1985 Cerboni ............... A23G 1/206
425/206
5,890,514 A 4/1999 Siddiqui
(Continued)

FOREIGN PATENT DOCUMENTS

EP 1491468 A1 12/2004

*Primary Examiner* — Vishal Pancholi
*Assistant Examiner* — Robert K Nichols, II
(74) *Attorney, Agent, or Firm* — Morgan Lewis & Bockius LLP

(57) ABSTRACT

An apparatus and method for depositing flowable material comprising a chamber housing that receives and deposits flowable material, a rotary valve shaft and a piston shaft inside the chamber housing, the piston shaft rotatable in synchronization with the rotary valve shaft, wherein the piston shaft and the rotary valve shaft form a volumetric pocket to receive the flowable material, wherein the piston shaft rotates between a position that expands the volumetric pocket to draw the flowable material into the volumetric pocket, and a position that compresses the volumetric pocket to urge flowable material from the volumetric pocket.

10 Claims, 20 Drawing Sheets

(58) Field of Classification Search
CPC ........ A23G 1/205; A23G 1/206; A23G 3/021; A23G 3/203; B65D 88/68; B65G 53/4608; B65G 53/4633
USPC .... 222/367, 410, 370, 238, 271, 236, 181.1, 222/218, 220, 222, 235; 426/512–517, 426/519
See application file for complete search history.

(56) References Cited

U.S. PATENT DOCUMENTS

| | | | |
|---|---|---|---|
| 2006/0051476 A1 | 3/2006 | Fornaguera | |
| 2011/0121014 A1 | 5/2011 | Scheu | |
| 2013/0221026 A1* | 8/2013 | Fuqua | G01F 11/22 222/52 |
| 2014/0239019 A1* | 8/2014 | Altjohann | A23G 1/52 222/394 |
| 2015/0313252 A1* | 11/2015 | Stolpe | A23G 1/206 222/252 |

* cited by examiner

ROTARY PISTON DEPOSITOR SUPPORTING USER-CONFIGURABLE PRECISION MULTIPLE OUTPUT PORTS

CROSS REFERENCE TO RELATED APPLICATIONS

This application claims priority from U.S. provisional patent application U.S. Ser. No. 62/377,437 filed on Aug. 19, 2016 entitled ROTARY PISTON DEPOSITOR SUPPORTING USER-CONFIGURABLE PRECISION MULTIPLE OUTPUT PORTS and U.S. provisional patent application U.S. Ser. No. 62/477,610 filed on Mar. 28, 2017 entitled ROTARY PISTON DEPOSITOR SUPPORTING USER-CONFIGURABLE PRECISION MULTIPLE OUTPUT PORTS, which are expressly incorporated herein, to the fullest extent permitted by law.

BACKGROUND

1. Field of the Invention

The present invention relates to volumetric depositors (also called fillers) that deposit a desired quantity of flowable material, for example ingredients in a production line for food products. More particularly, the present invention relates to rotary piston depositors, as opposed to linear piston depositors and roller feed depositors.

2. Description of Related Art

Volumetric depositors are designed to portion flowable products. They are widely used in the baking, food, cosmetic, animal feed, pharmaceutical and packaging industries. Although they are referred to as "depositors" in the baking industry, many other industries refer to them as "fillers".

Roller feed depositors deploy a pair of opposed rollers to accept a gravity-feed of material from a hopper and to frictionally drive the material into an output manifold toward one or more output ports. The amount of material deposited is a function of both the flow-rate and the period of flow through the rollers. For more precise deposit control, the friction rollers may be replaced with opposed toothed rollers in a gear pump configuration.

Those skilled in the art will appreciate that roller feed depositors face a number of challenges. They can:
  be imprecise, because dispensed volume cannot be directly controlled, but only indirectly controlled as a function of feed rate and period,
  be imprecise when feeding a common output manifold with multiple output ports, because flow can vary between output ports,
  be imprecise, because feed depends on predictable gravity flow from the hopper,
  damage the fed material through rough frictional handling,
  inject air bubbles into the fed material, and
  be difficult to clean to food-grade sanitary standards.

Linear piston depositors deploy a separate linear piston to feed each output port, the linear pistons being connected through respective product cylinders and a valve system to a hopper or other supply of feed material so as to draw in the feed material from the hopper under vacuum during an intake stroke and to portion the feed material to its respective output port during a deposit stroke.

Those skilled in the art will appreciate that linear piston depositors face a number of challenges. They can:
  require many parts and significant room for multiport configurations, and
  be difficult to reconfigure to a higher or lower number of output ports or to change spacing between output ports.

In another approach, the Fedco™ Excalibur™ piston depositor, no longer manufactured by Peerless Food Equipment of Sidney, Ohio, USA but still in use and available used through secondary channels, deployed a single rotary piston between a hopper of feed material and an output manifold connected to supply one or more output ports, so as to draw in the feed material from the hopper under vacuum during an intake stroke and to portion the feed material to the manifold during a deposit stroke.

Those skilled in the art will appreciate the that Excalibur™ depositor faces a number of challenges. It can be:
  imprecise when feeding a common output manifold with multiple output ports, because the rotary piston is a single piston without divisions, and
  subject to material buildup and contamination of material between its half-moon-type rotary cut-off valve and nozzle housing.

Accordingly, what is needed is a better way to address these challenges.

SUMMARY

The present invention is directed to this need, providing a way to configure a rotary piston depositor to precisely deposit multiple flows of material simultaneously.

According to one aspect of the present invention, there is provided an apparatus for depositing flowable material, having: a chamber housing that forms a shell having an internal contour, an input port for receiving the flowable material and an output port for depositing the flowable material, a rotary valve shaft within the shell adjacent the output port, the rotary valve shaft having an inflow port and an outflow port and being rotatable within the shell between a deposition position wherein the outflow port is in alignment with the output port and an intake position wherein the inflow port is in alignment with the input port, and a piston shaft within the shell between the input port and the rotary valve shaft and rotatable in synchronization with the rotary valve shaft, the piston shaft having at least one piston plate that radiates to the interior contour of the shell, such that the piston shaft and the rotary valve shaft form with the shell a volumetric pocket to receive the flowable material from the input port, wherein, when the rotary valve shaft is in the intake position, the piston shaft rotates to expand the volumetric pocket to draw in flowable material from the input port through the inflow port and the outflow port, and when the rotary valve shaft is in the deposition position, the piston shaft rotates to compress the volumetric pocket to urge flowable material from the volumetric pocket through the input port and the outflow port to the output port.

The apparatus may further include at least one annular spacer that radiates from the piston shaft to the interior contour of the shell to divide the volumetric pocket into at least two volumetric pockets. In this regard, the rotary valve shaft may have a respective inflow port and outflow port for each of the at least two volumetric pockets. The at least one annular spacer may have an arcuate notch configured to receive for rotation therewithin the rotary valve shaft.

The piston shaft and the rotary valve shaft may be removable from the chamber housing for cleaning. Similarly, the at least one piston plate and the at least one annular spacer may be removable from the piston shaft for cleaning.

The inflow port and the outflow port may define between them a right angle.

The inflow port may be larger than the outflow port.

The apparatus may be adapted to be cantilevered above a production line.

The apparatus may further include a cut-off valve attachment coupled to the output port.

According to another aspect of the present invention, there is provided a method of depositing flowable material by forming a volumetric pocket within a shell housing a piston shaft and a rotary valve shaft, rotating the rotary valve to an intake position, rotating the piston shaft to expand the volumetric pocket, thereby drawing the flowable material into volumetric pocket through the rotary valve, rotating the rotary valve to a deposit position, and rotating the piston shaft to compress the volumetric pocket, thereby urging the flowable material out of the volumetric pocket through the rotary valve.

Further aspects and advantages of the present invention will become apparent upon considering the following drawings and description that illustrate exemplary embodiments of the invention.

DESCRIPTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

1. BRIEF DESCRIPTION OF THE DRAWINGS

Figure 1:
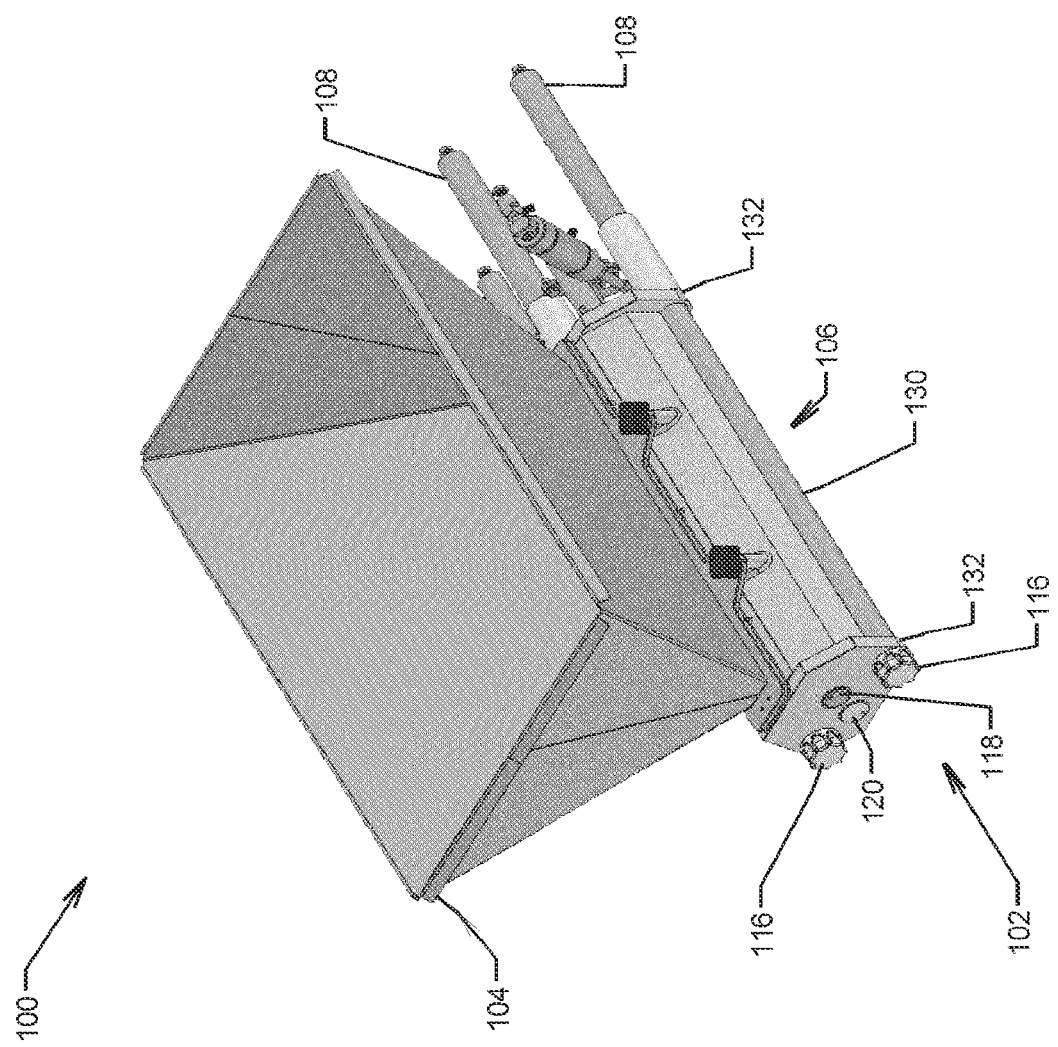
FIG. 1 is a top-front-right oblique view of a first embodiment of a rotary piston depositor in accordance with aspects of the present invention, the depositor having a hopper connected to feed a rotary piston mechanism.

2. DETAILED DESCRIPTION OF SPECIFIC EMBODIMENTS (a) Structure of Specific Embodiments The structure of the invention will now be illustrated by explanation of specific, non-limiting, exemplary embodiments shown in the drawing figures and described in greater detail herein.

| Part Legend - Sorted by Part Number | | Part Legend - Sorted by Part Name | |
|---|---|---|---|
| Number | Name | Name | Number |
| 100 | rotary piston depositor | actuator | 126 |
| 102 | piston mechanism | annular spacers | 142 |
| 104 | hopper | arcuate notches | 148 |
| 106 | chamber housing | attachment housing | 160 |
| 108 | cantilever arms | attachment quick-coupler | 162 |
| 110 | hopper lugs | bushings | 140 |
| 112 | hopper pins | cantilever arms | 108 |
| 114 | hopper bolts | chamber | 128 |
| 116 | tension knobs | chamber housing | 106 |
| 118 | piston shaft | coupling knuckle | 122 |
| 120 | rotary valve shaft | cut-off valve attachment | 158 |
| 122 | coupling knuckle | cut-off valve drive | 166 |
| 124 | reciprocating coupler | cut-off valve shaft | 164 |
| 126 | actuator | endplates | 132 |
| 128 | chamber | grips | 138 |
| 130 | shell | hopper | 104 |
| 132 | endplates | hopper bolts | 114 |
| 134 | input ports | hopper lugs | 110 |
| 136 | output ports | hopper pins | 112 |
| 138 | grips | inflow port | 150 |
| 140 | bushings | input ports | 134 |
| 142 | annular spacers | internal contour | 146 |
| 144 | piston plates | outflow port | 152 |
| 146 | internal contour | output ports | 136 |
| 148 | arcuate notches | passage | 154 |
| 150 | inflow port | piston mechanism | 102 |
| 152 | outflow port | piston plates | 144 |
| 154 | passage | piston shaft | 118 |
| 156 | volumetric pocket | reciprocating coupler | 124 |
| 158 | cut-off valve attachment | rotary piston depositor | 100 |
| 160 | attachment housing | rotary valve shaft | 120 |
| 162 | attachment quick-coupler | shell | 130 |

-continued

| Part Legend - Sorted by Part Number | | Part Legend - Sorted by Part Name | |
|---|---|---|---|
| Number | Name | Name | Number |
| 164 | cut-off valve shaft | tension knobs | 116 |
| 166 | cut-off valve drive | volumetric pocket | 156 |

Figure 2:
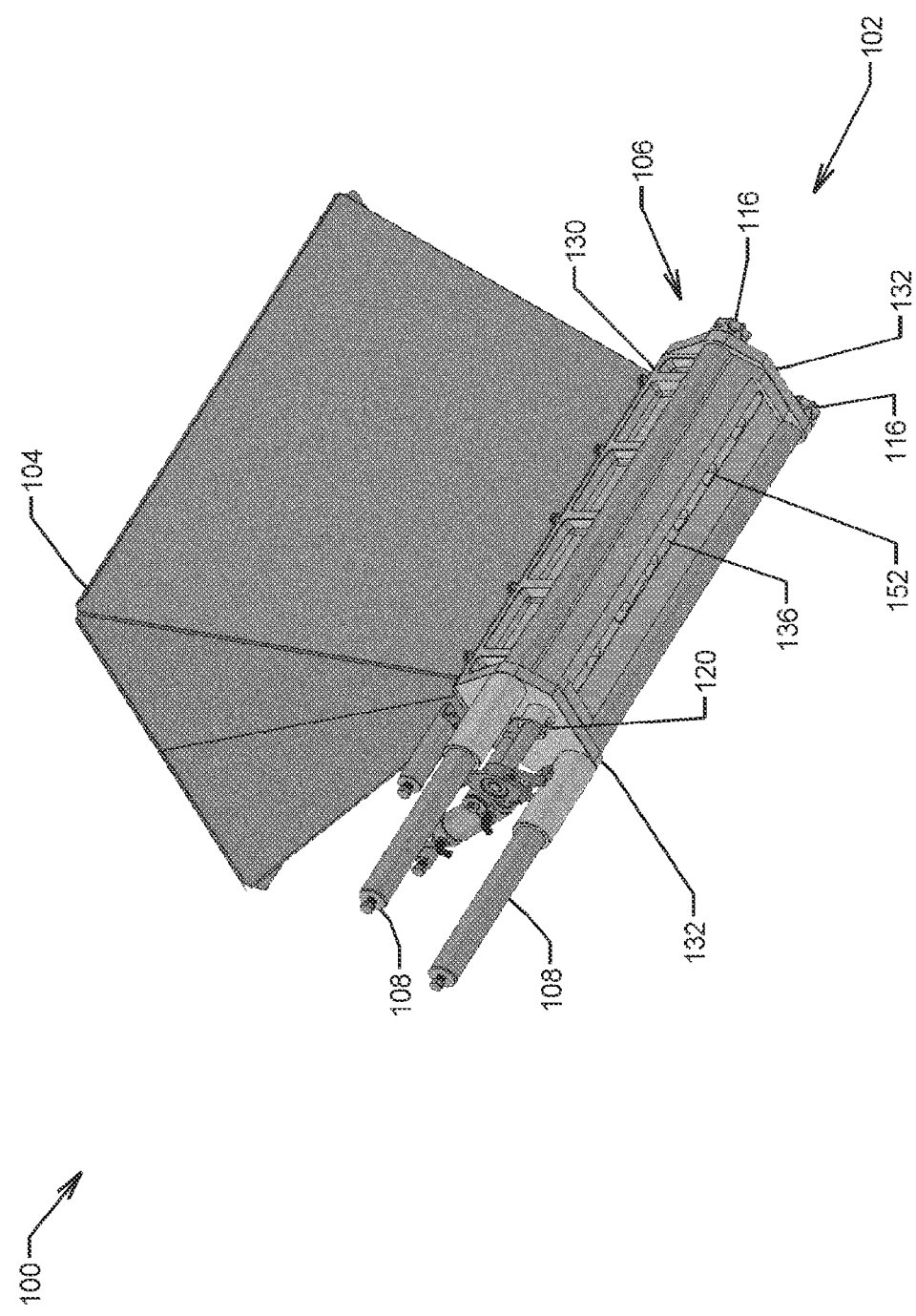
FIG. 2 is a bottom-rear-left oblique view of the depositor of FIG. 1.

FIGS. 1 and 2 show a rotary piston depositor according to one embodiment of the present invention, generally illustrated at 100. The rotary piston depositor 100 includes a piston mechanism 102 connected to receive flowable material from a supply of material, as illustrated a hopper 104, and to deposit portions of the flowable material in a predetermined volume, for example in a production line. Those skilled in the art will recognize that other supply arrangements might be used instead of the hopper 104, for example a pressurized manifold.

Figure 3:
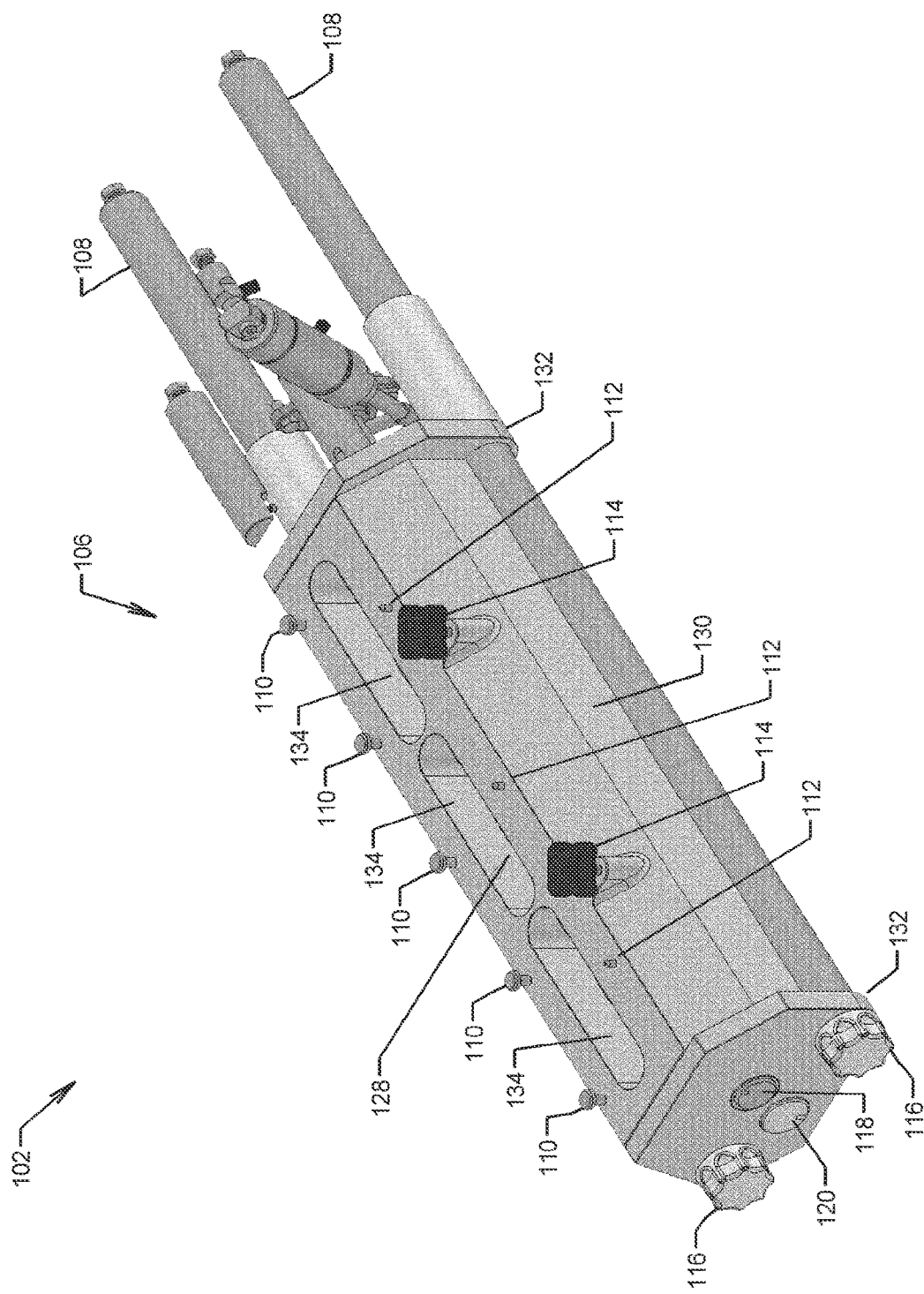
FIG. 3 is a top-front-right oblique view of the depositor of FIG. 1, with the hopper suppressed to better illustrate the piston mechanism, which includes a chamber housing having a shell.
Figure 4:
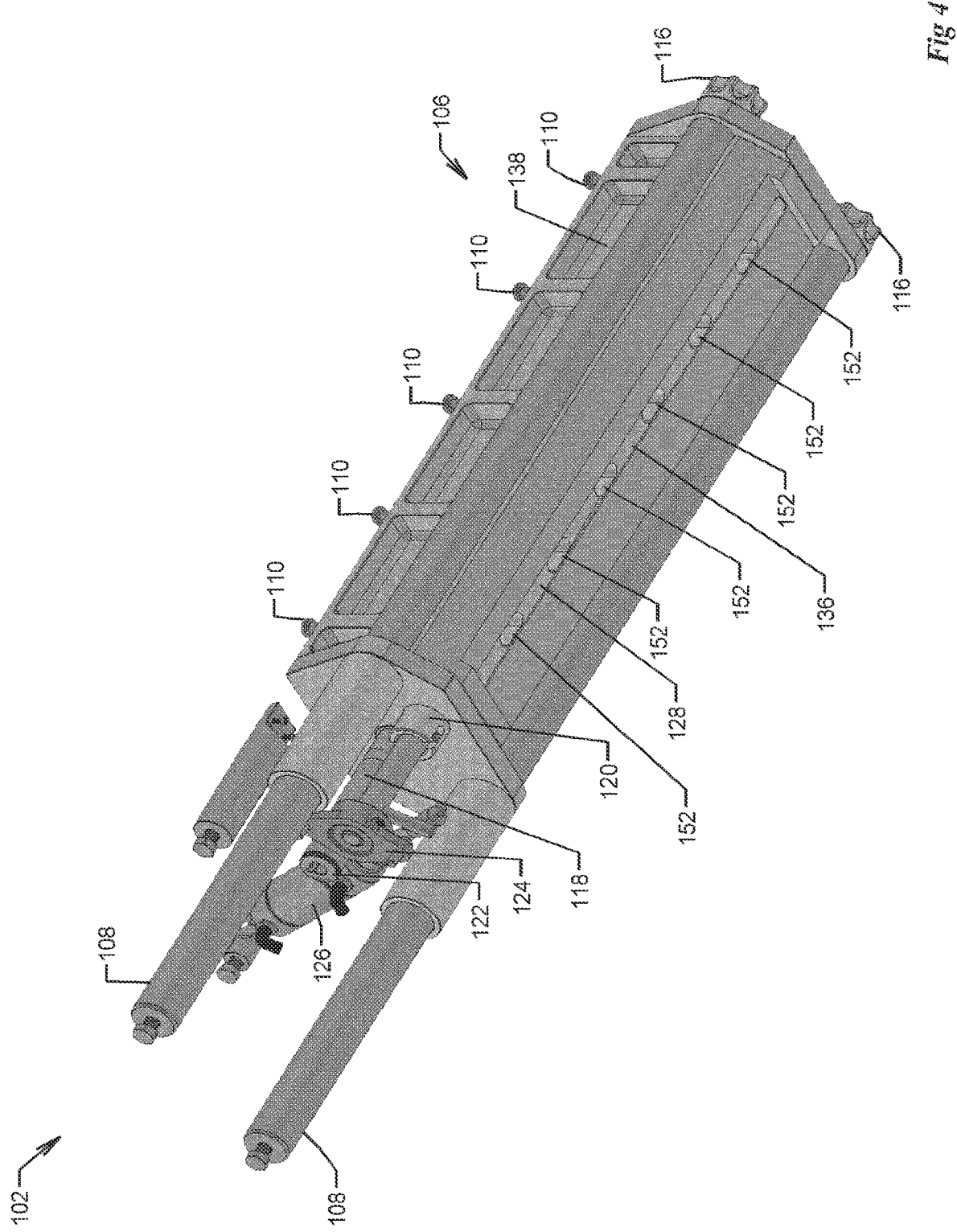
FIG. 4 is a bottom-rear-left oblique view of the depositor of FIG. 3.
Figure 5:
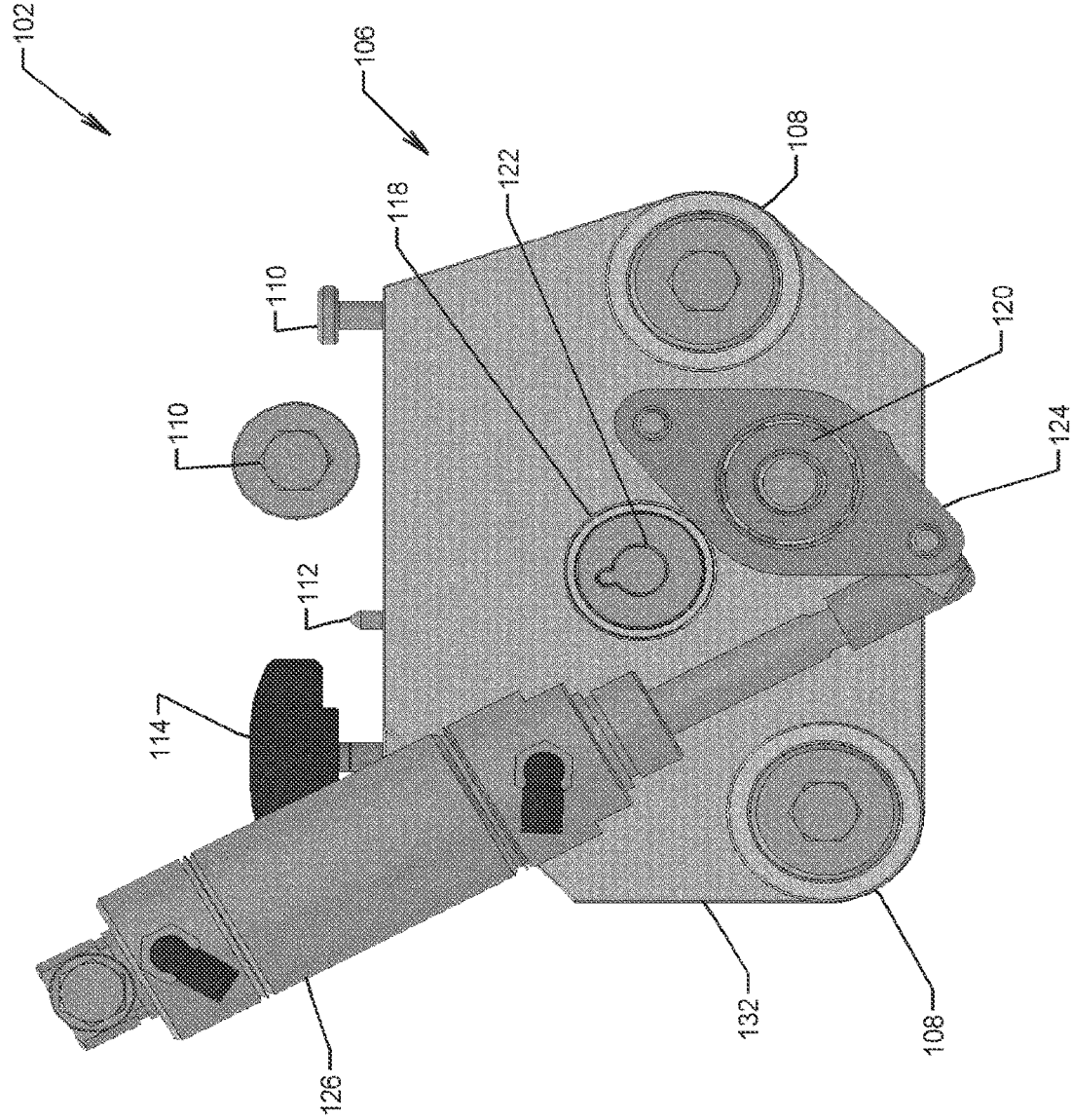
FIG. 5 is a rear elevation view of the depositor of FIG. 3.

FIGS. 3-5 show the rotary piston depositor 100 with the hopper 104 suppressed to better illustrate the piston mechanism 102.

The piston mechanism 102 includes a chamber housing 106 that may be supported on one or more cantilever arms 108 so that the rotary piston depositor 100 may be conveniently deployed and redeployed above production lines. The chamber housing 106 includes appropriate fasteners, including for example one or more hopper lugs 110, hopper pins 112, and hopper bolts 114 to align and fasten the hopper 104 in place, and one or more tension knobs 116 to retain the chamber housing 106 together and on the cantilever arms 108.

The piston mechanism 102 also includes a piston shaft 118 and a rotary valve shaft 120 as will be described further below. The piston shaft 118 may support a coupling knuckle 122 or other such flexible coupling for coupling the piston shaft 118 to a rotary mover (not shown for clarity), for example a servo motor. In this regard, those skilled in the art will appreciate that a servo motor provides precise and accurate control of position and speed, allowing a user to adjust the angular sweep and velocity of the piston shaft 118 to suit the material being deposited and the product being produced, for example, in terms of volume being deposited, gentleness of handling, and speed of production. Those skilled in the art will recognize that the velocity of the angular sweep of the piston shaft 118 can be maintained constant for uniformity of deposition or varied throughout the sweep for contoured deposition. Those skilled in the art will also understand that the amount of the angular sweep can be small or large, for example 180 degrees or more, providing for significant and precise adjustment of deposit volume portioning, as will be described further below.

The rotary valve shaft 120 may support a reciprocating coupler 124 driveably connectable to an actuator 126, for example a double-acting pneumatic or hydraulic actuator, as illustrated, to rotate the rotary valve shaft 120 between an intake position and a deposition position.

The chamber housing 106 may have two or more mating portions to define within it a chamber 128 that is user-accessible for cleaning and configuration. As illustrated, the chamber housing 106 may be formed as an open-ended elongated shell 130, closable by one or more respective endplates 132. As illustrated, the shell 130 and the endplates 132 can be retained on the cantilever arms 108 and compressed together with the tension knobs 116. The piston shaft 118 and the rotary valve shaft 120 are rotatable within the endplates 132.

The shell 130 includes one or more input ports 134 through which the chamber 128 may receive material from the hopper 104 and one or more output ports 136 through which material may be dispensed from the chamber 128 for depositing. The shell 130 may also include one or more grips 138 to assist a user to grip the shell 130 for disassembly, cleaning, configuration and reassembly, as will be described further below. As illustrated, the grips 138 may be formed as cavities in the shell 130 that reduce the amount of material used to form the shell 130, thus reducing the cost and weight of the shell 130.

Figure 6:
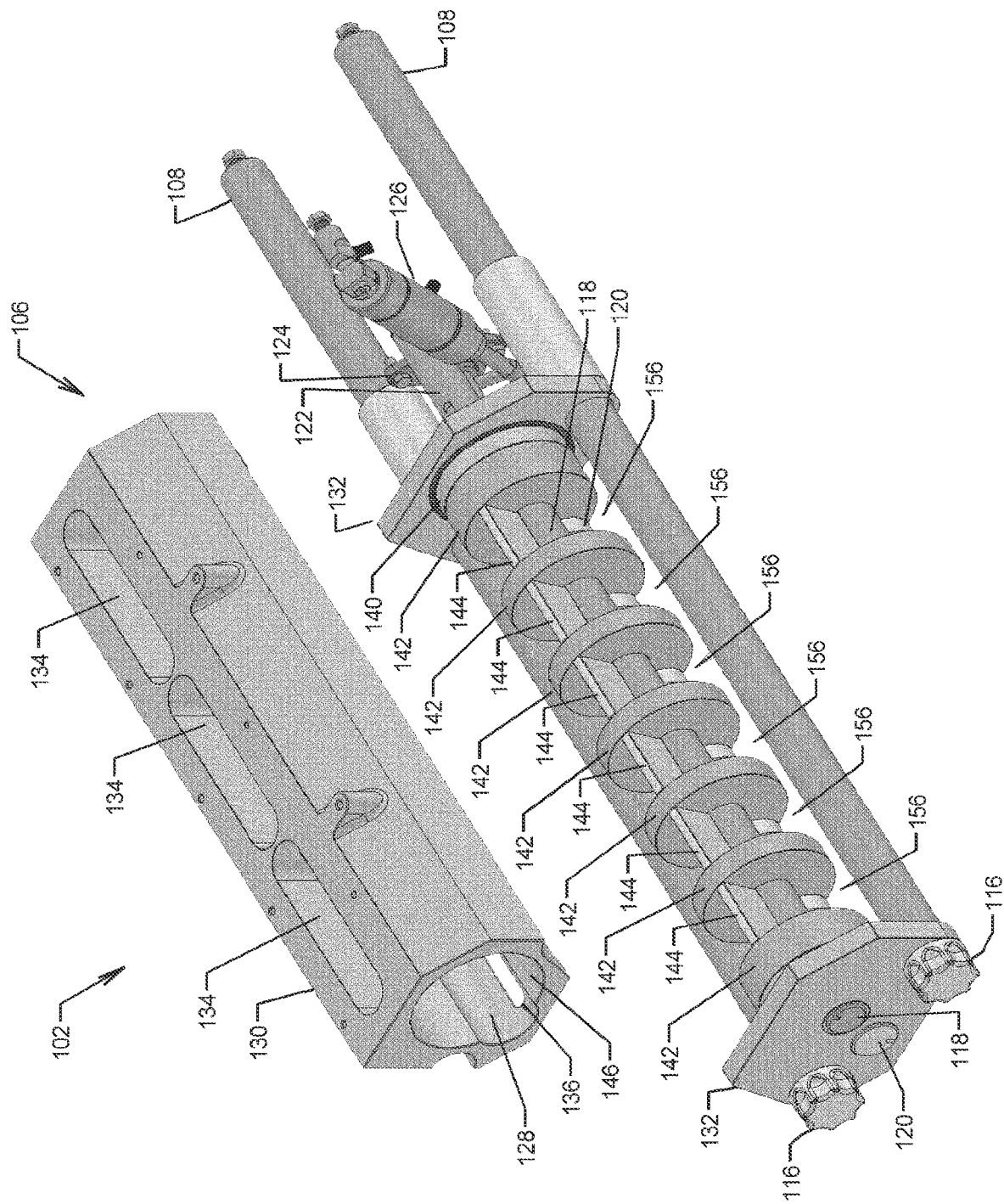
FIG. 6 is a top-front-right oblique exploded view of the depositor of FIG. 3, with the shell of the chamber housing removed to reveal a rotary piston and a rotary valve shaft.
Figure 7:
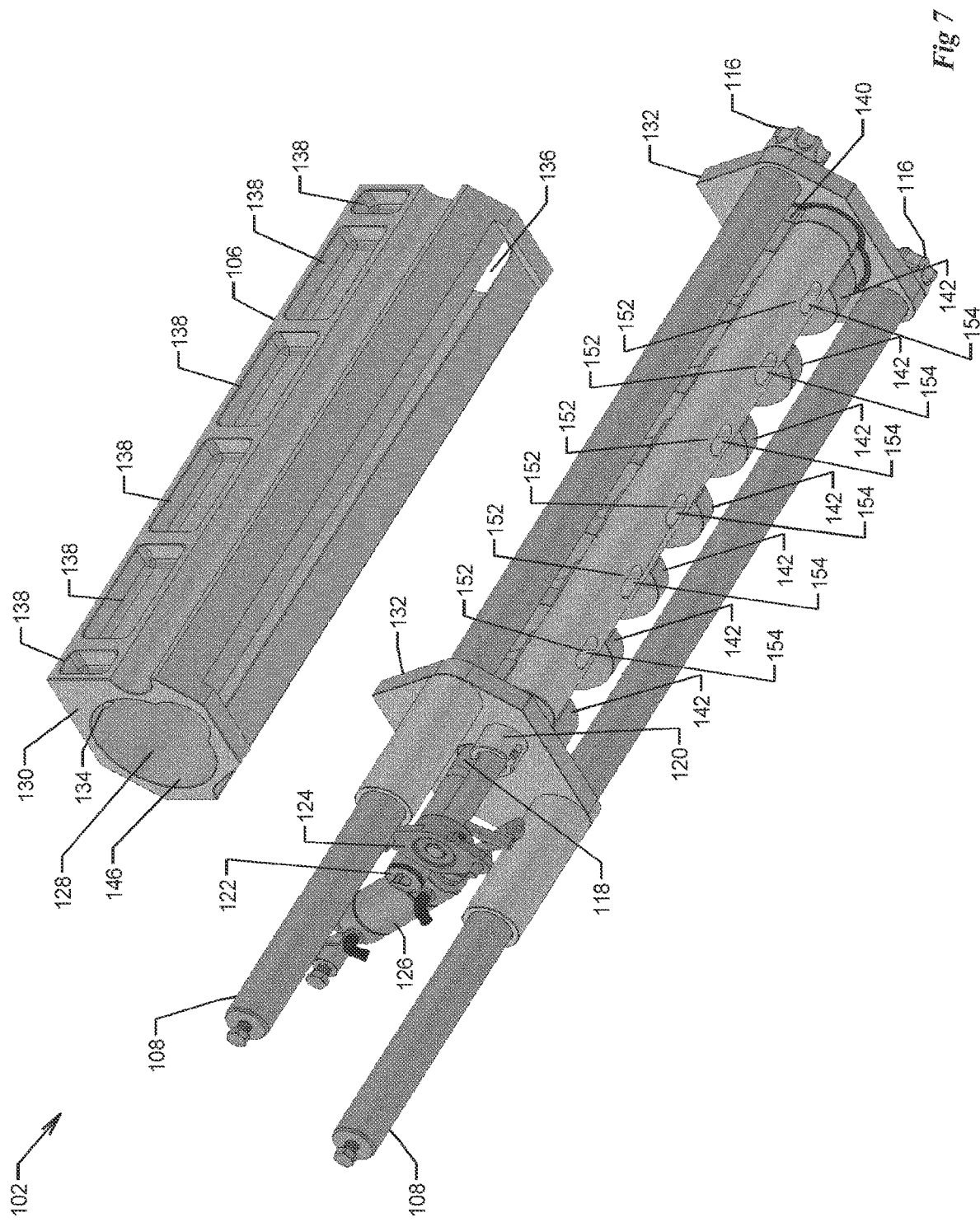
FIG. 7 is a bottom-rear-left oblique view of the depositor of FIG. 6.
Figure 8:
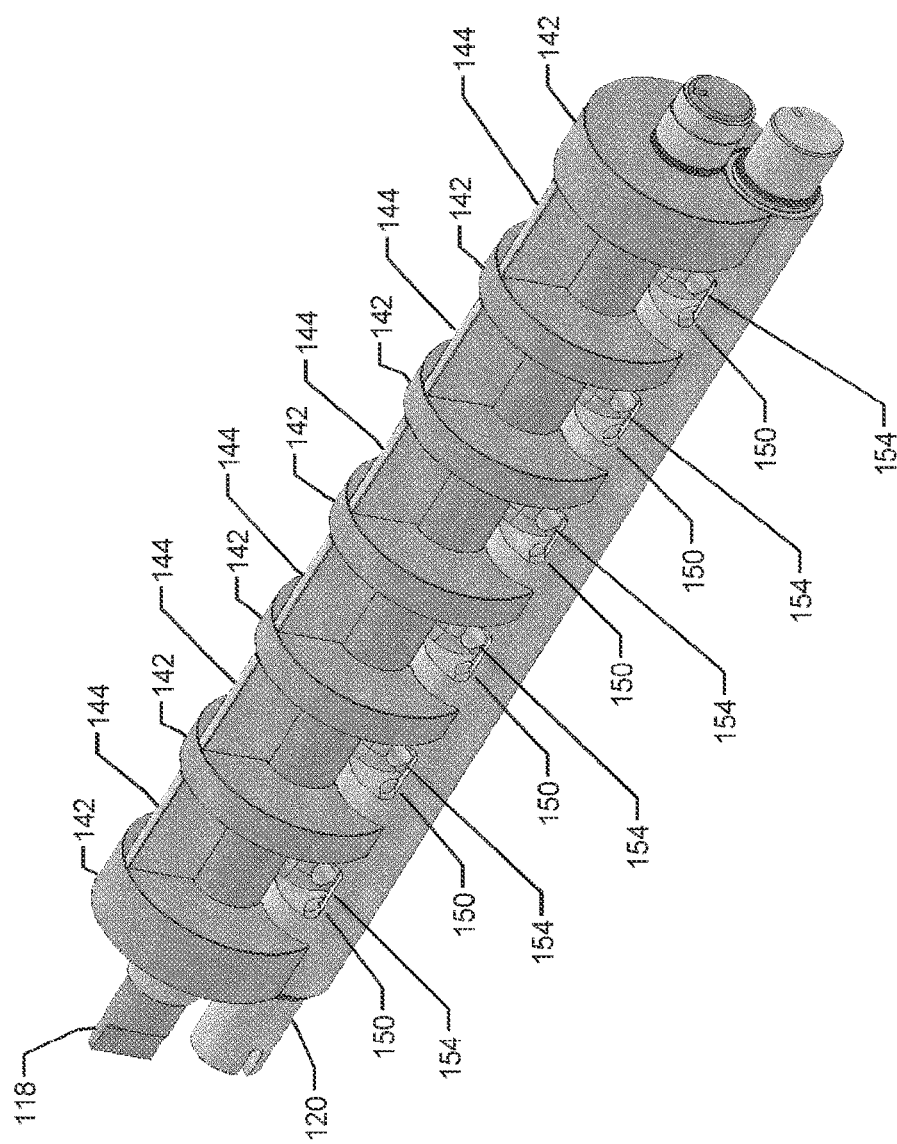
FIG. 8 is a top-front-left oblique view of the rotary piston and rotary valve shaft of FIG. 6 in isolation, the rotary valve shaft in an intake position.
Figure 9:
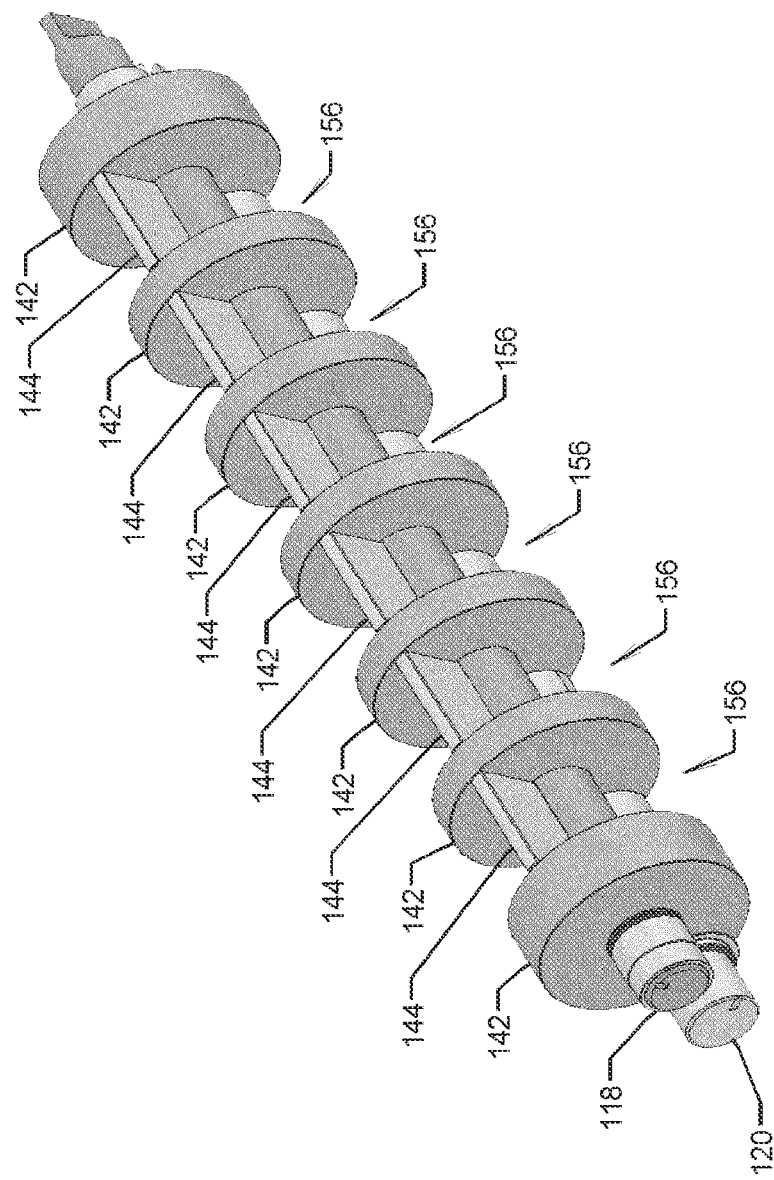
FIG. 9 is a top-front-right oblique view of the rotary piston and rotary valve shaft of FIG. 8.
Figure 10:
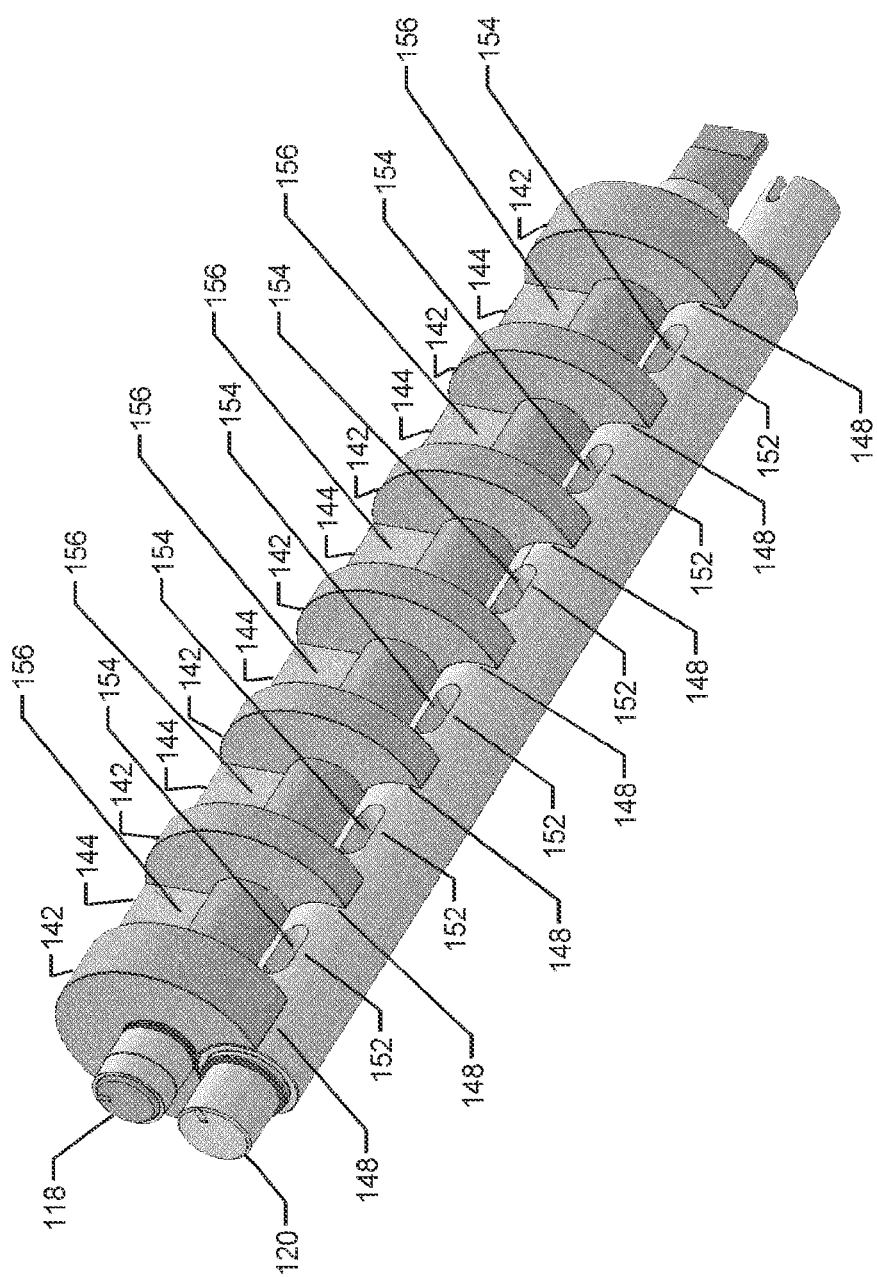
FIG. 10 is a bottom-front-right oblique view of the rotary piston and rotary valve shaft of FIG. 8.
Figure 11:
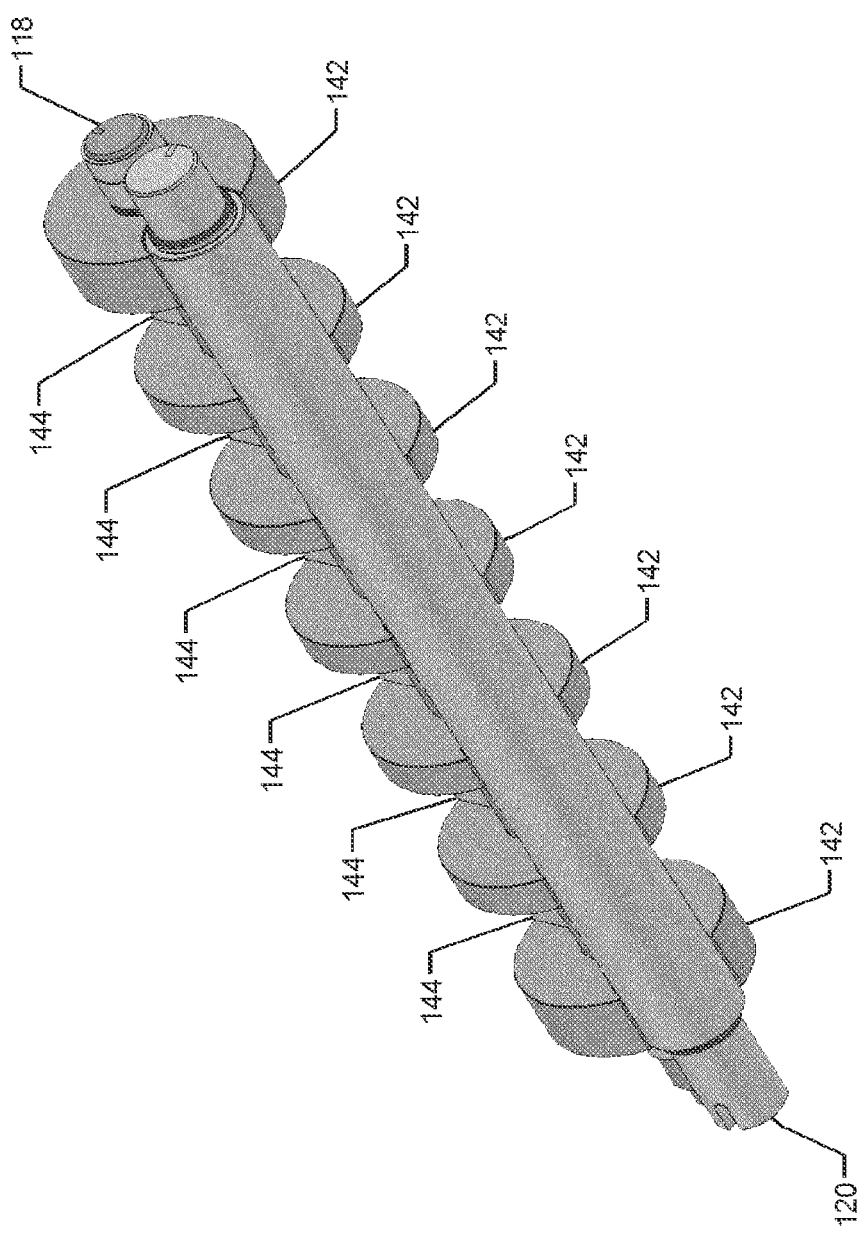
FIG. 11 is a bottom-front-left oblique view of the rotary piston and rotary valve shaft of FIG. 8.
Figure 12:
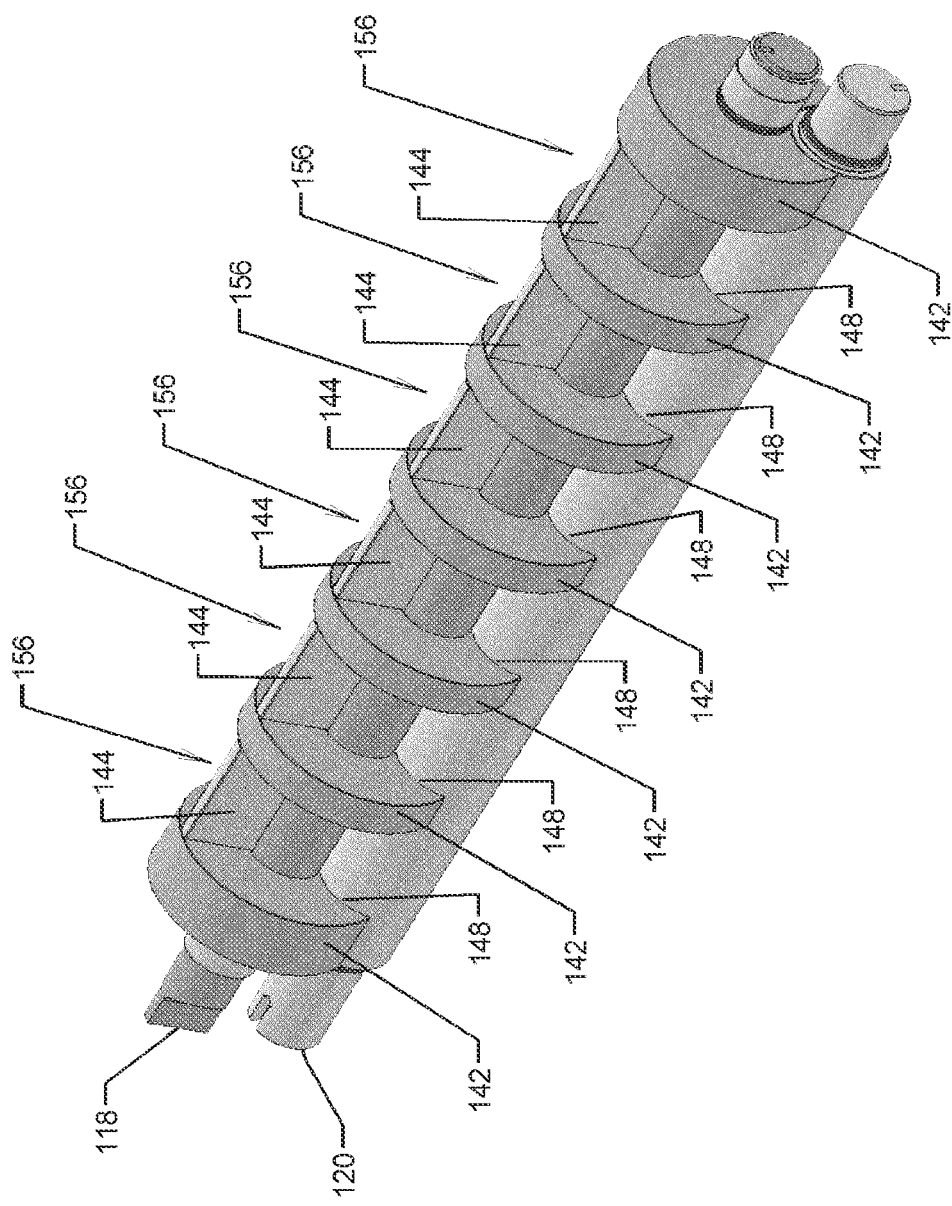
FIG. 12 is a top-front-left oblique view of the rotary piston and rotary valve shaft of FIG. 6 in isolation, the rotary valve shaft in a deposition position.
Figure 13:
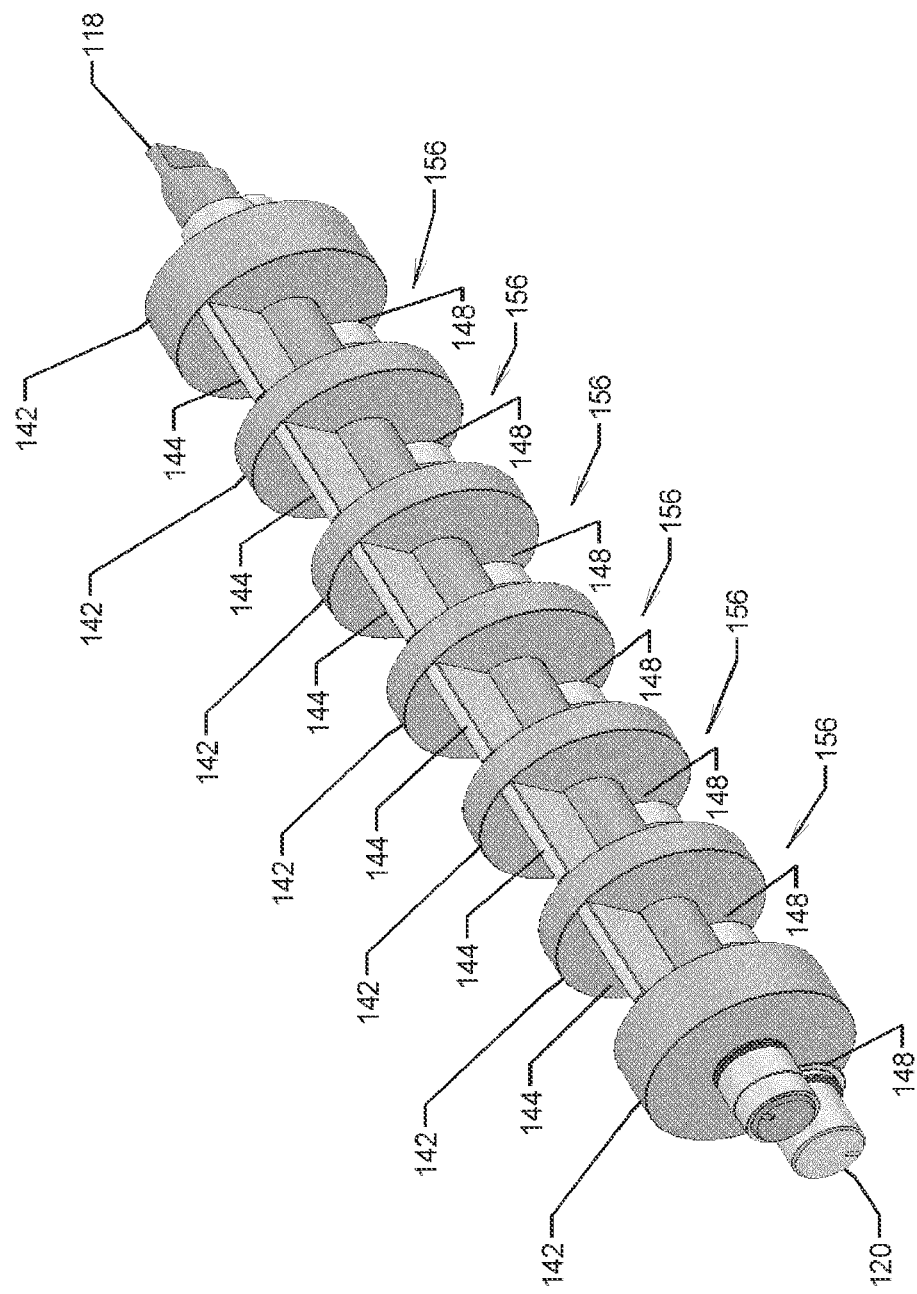
FIG. 13 is a top-front-right oblique view of the rotary piston and rotary valve shaft of FIG. 12.
Figure 14:
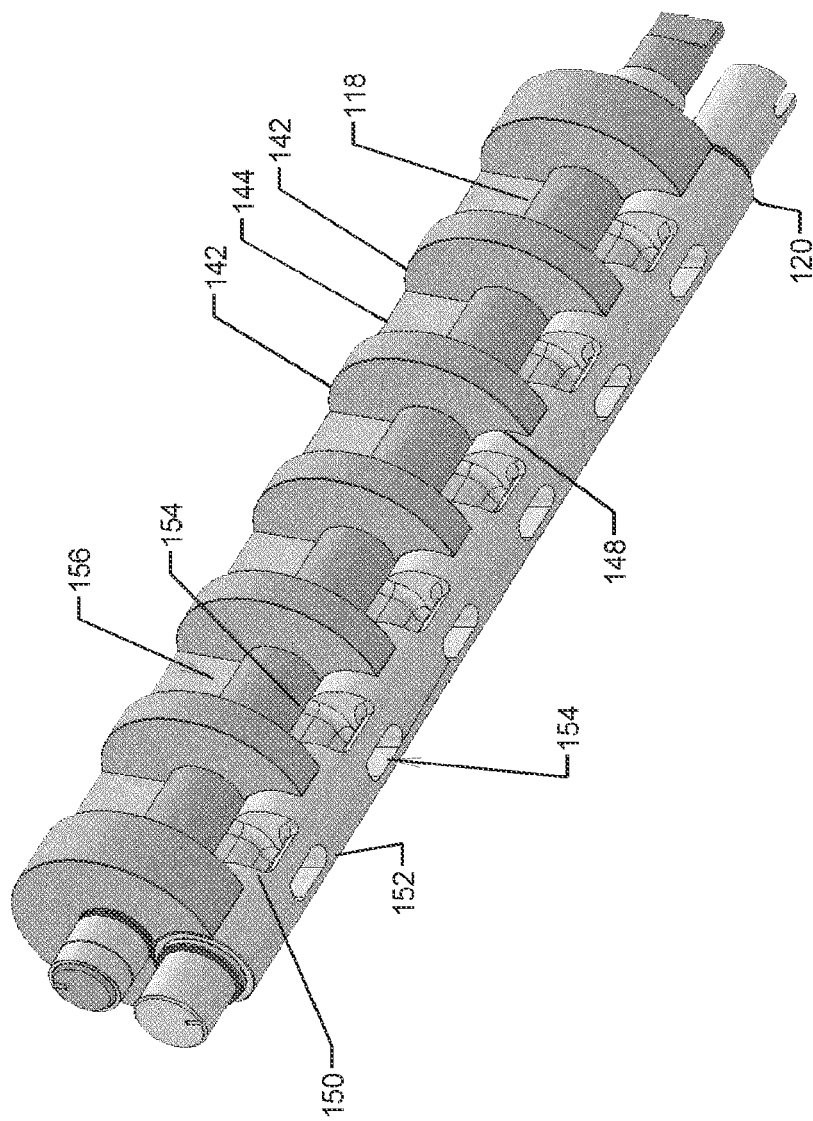
FIG. 14 is a bottom-front-right oblique view of the rotary piston and rotary valve shaft of FIG. 12.
Figure 15:
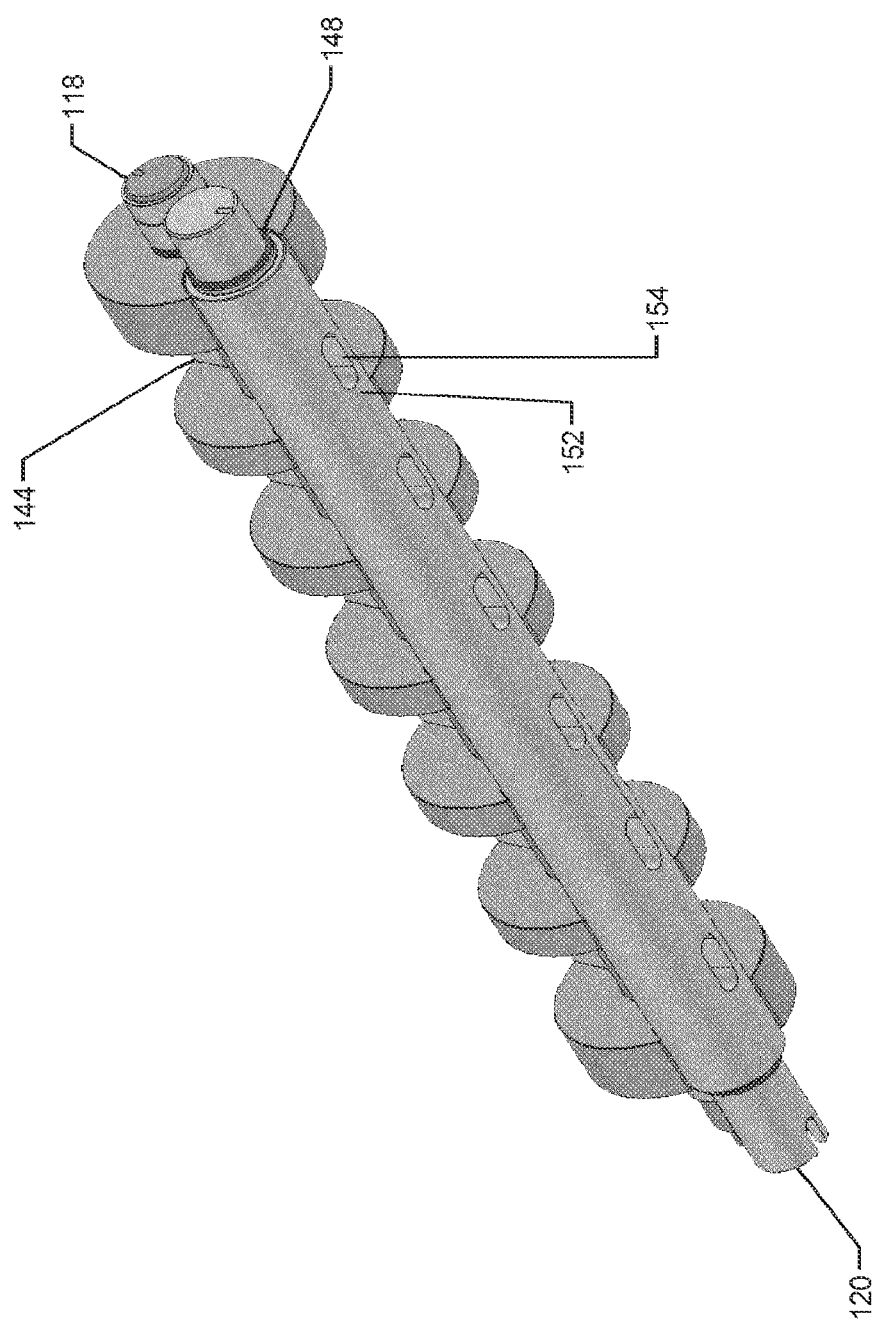
FIG. 15 is a bottom-front-left oblique view of the rotary piston and rotary valve shaft of FIG. 12.
Figure 16:
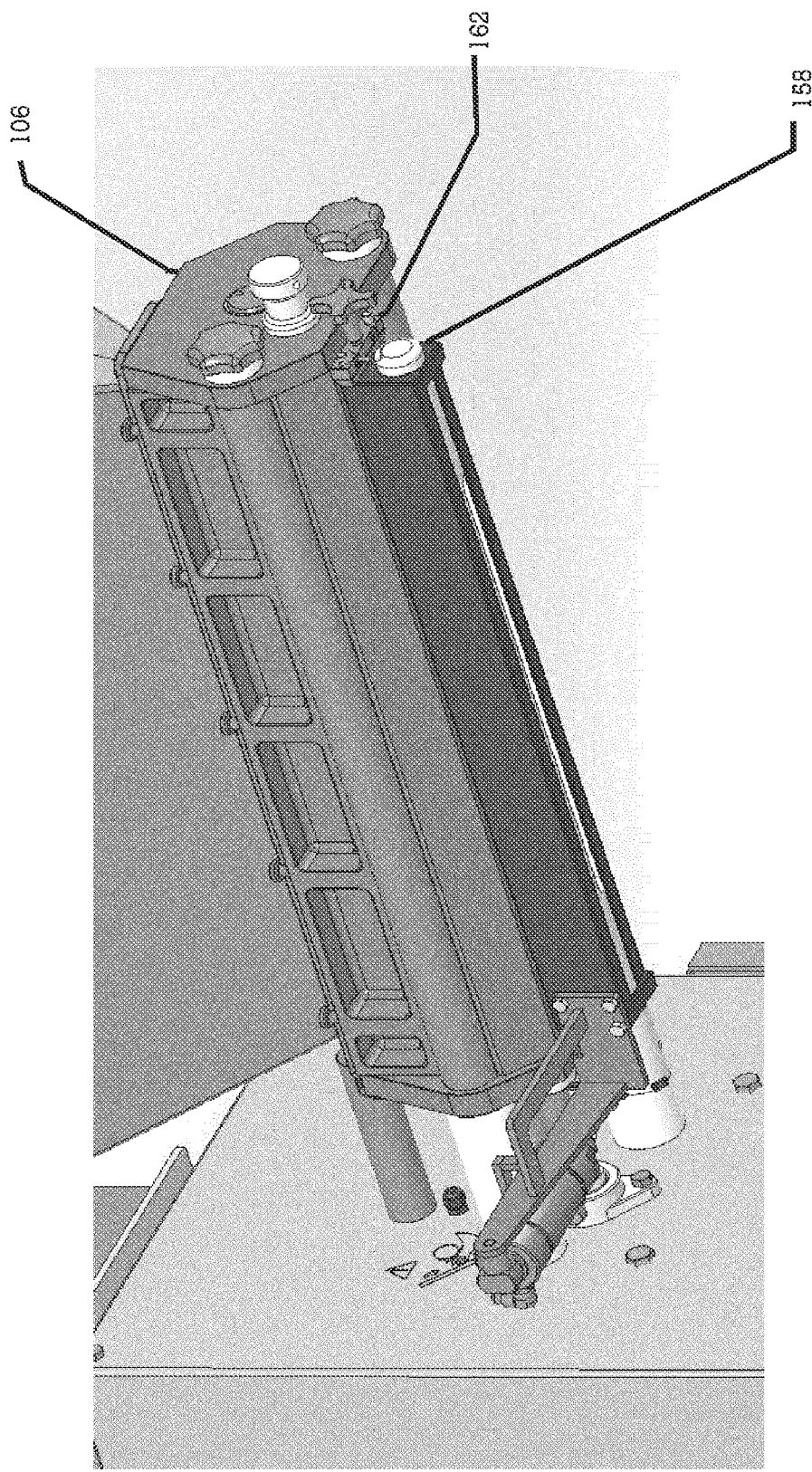
FIG. 16 is a bottom-front-left oblique view of the depositor of FIG. 1, further including a cut-off valve attachment.
Figure 17:
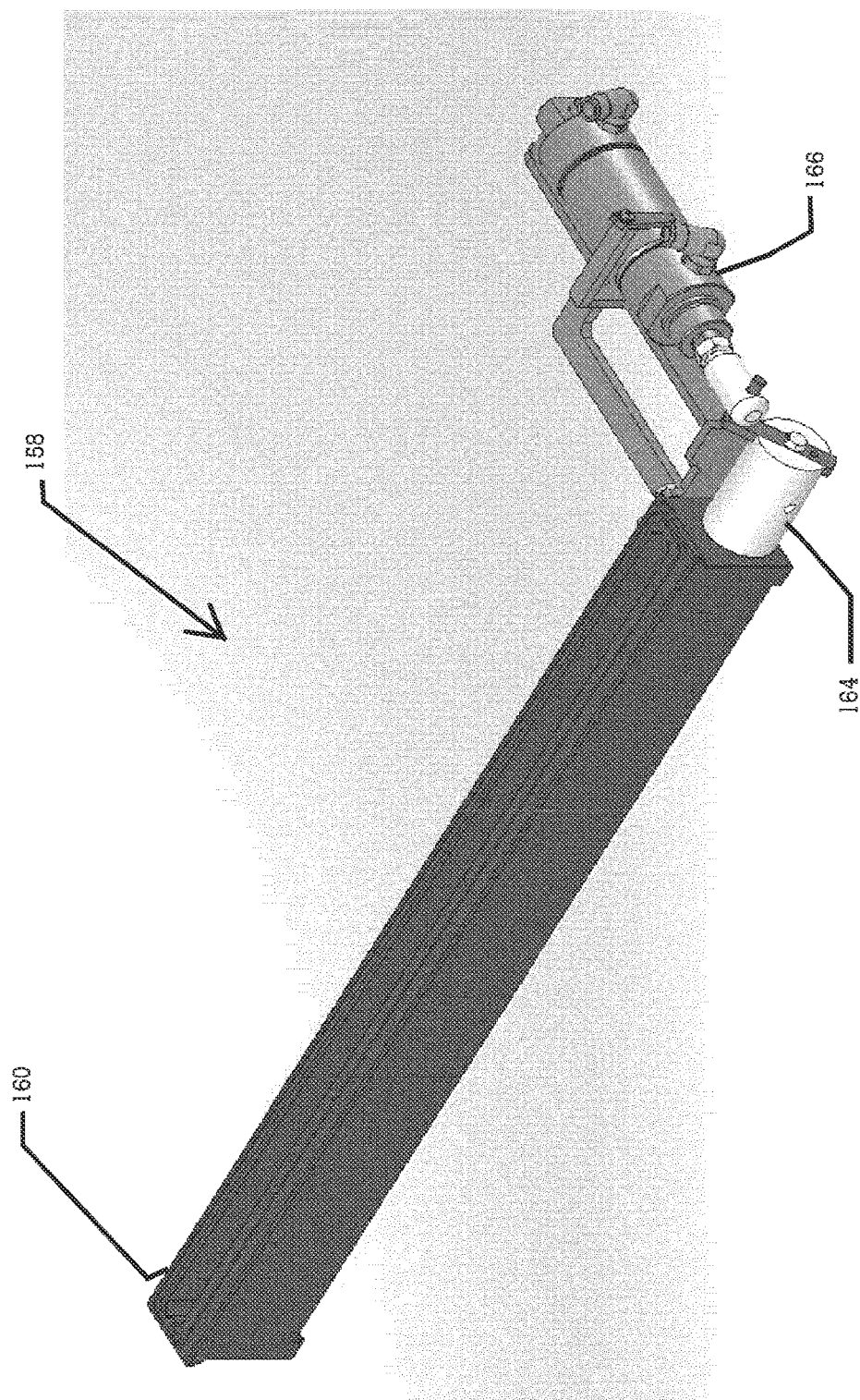
FIG. 17 is a top-rear-right oblique view of the cut-off valve attachment of FIG. 16, the cut-off valve attachment having an attachment housing, a cut-off valve shaft, and a cut-off valve drive.
Figure 18:
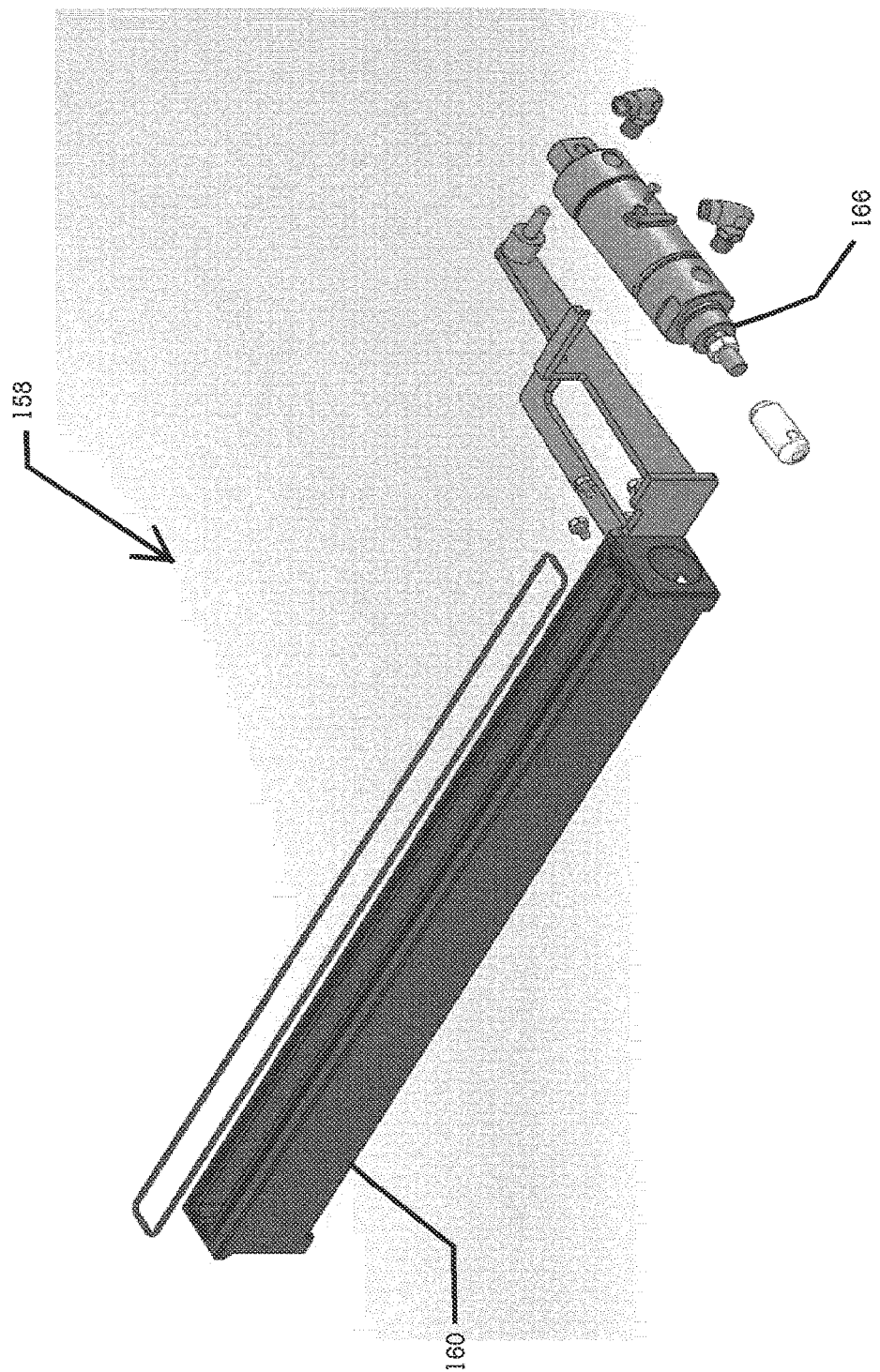
FIG. 18 is an exploded top-rear-right oblique view of the cut-off valve attachment of FIG. 17, with the cut-off valve shaft suppressed.
Figure 19:
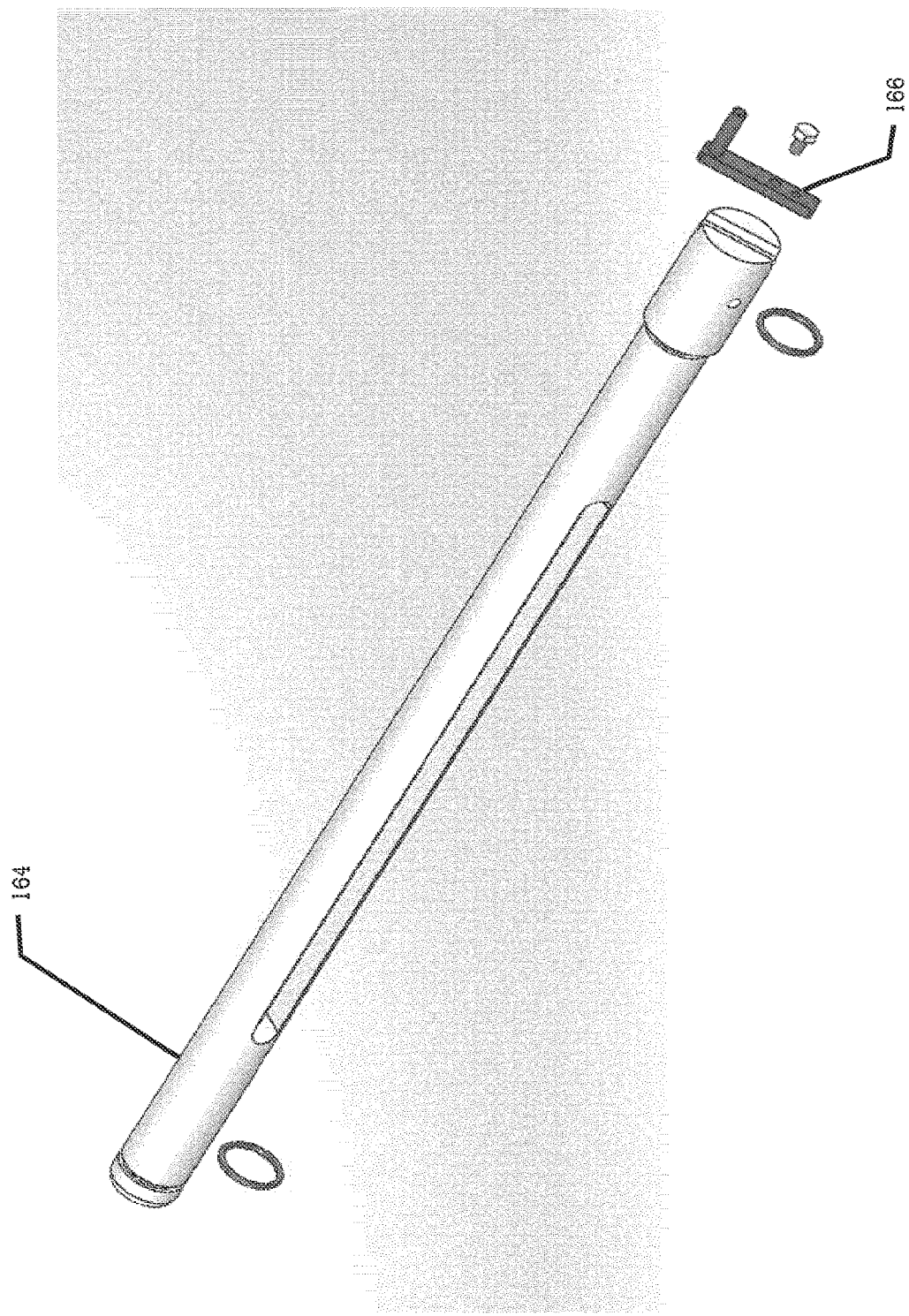
FIG. 19 is an exploded top-rear-right oblique view of the cut-off valve shaft of FIG. 17.
Figure 20:
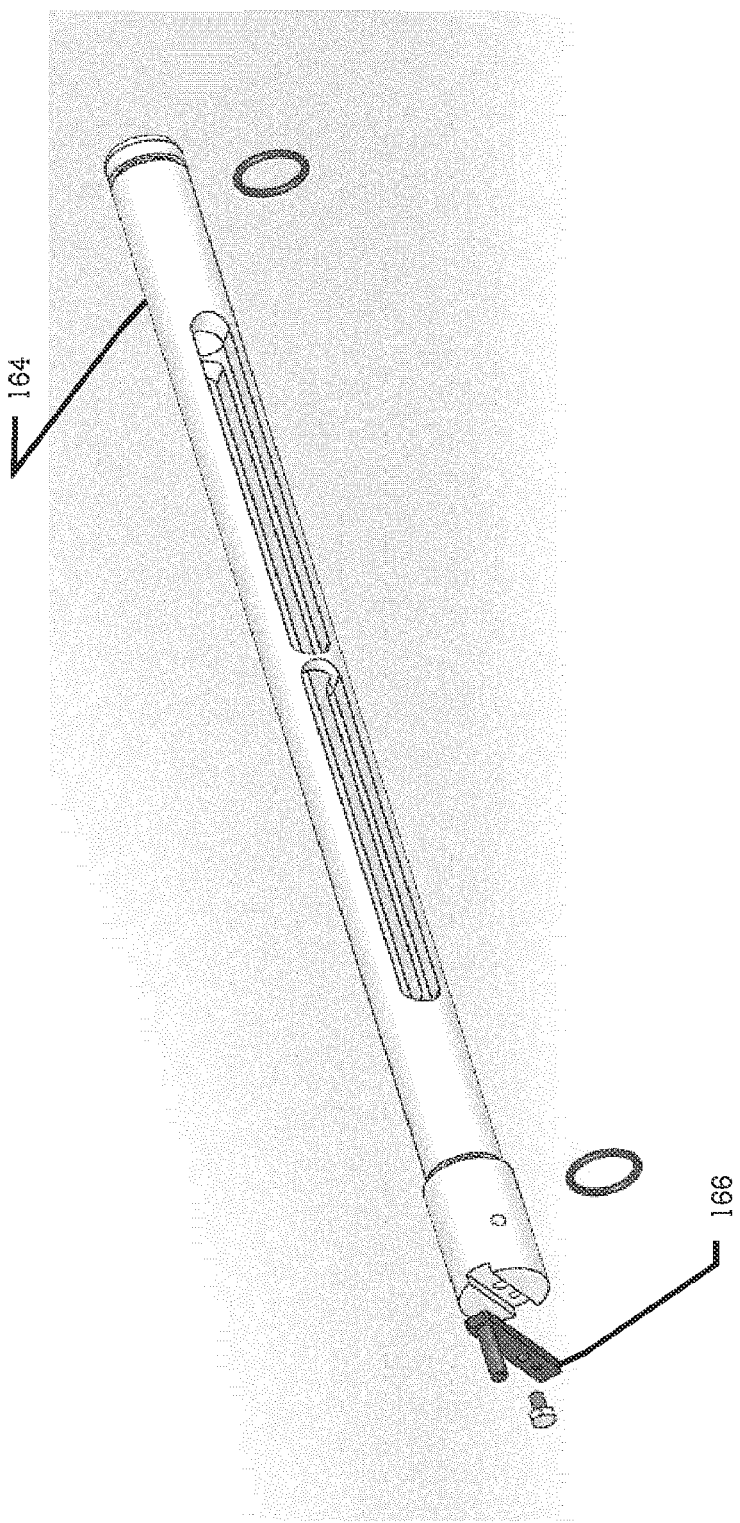
FIG. 20 is an exploded top-front-left oblique view of the cut-off valve shaft of FIG. 19.

FIGS. 6 and 7 show the rotary piston depositor 100 with the hopper 104 suppressed and the shell 130 removed to better illustrate those components of the piston mechanism 102 that reside within the chamber 128.

The piston shaft 118, which as noted above is rotatable within the endplates 132, bears against bushings 140 at the endplates 132. The piston shaft 118 supports two or more annular spacers 142 and one or more radial piston plates 144 along its length, each of the piston plates 144 extending between adjacent annular spacers 142. Those skilled in the art will notice that the internal contour 146 of the shell 130 circumscribes both the annular spacers 142 and the rotary valve shaft 120 so as to allow rotation of the piston shaft 118 and the rotary valve shaft 120 within the shell 130 but resist flow of material past the annular spacers 142.

Terminal annular spacers 142 at each end of the piston shaft 118 define between them an overall maximum deposit width, to configure the rotary piston depositor 100 to suitably deposit material for a desired production container, such as a baking pan, having a predetermined width. Additional intermediate annular spacers 142 may be mounted on the piston shaft 118 between the terminal annular spacers 142 to divide the flow of material for deposition, for example to supply a baking pan having a row of cavities or a row of individual baking pans.

FIGS. 8-11 show the piston shaft 118 and the rotary valve shaft 120 in isolation from the rest of the rotary piston depositor 100, with the rotary valve shaft 120 in an intake position.

As illustrated, the annular spacers 142 have respective arcuate notches 148 configured to receive for rotation therewithin the rotary valve shaft 120. In an alternative embodiment, the rotary valve shaft 120 may instead have the respective arcuate notches 148, each configured to receive for rotation therewithin a respective one of the annular spacers 142 born by the piston shaft 118, in this embodiment the annular spacers 142 having the possibility of being rotatable with the piston shaft 118 and the piston plates 144 instead of the piston shaft 118 and the piston plates 144 freewheeling within the annular spacers 142.

The rotary valve shaft 120 also has one inflow port 150 and one outflow port 152 between each respective pair of adjacent annular spacers 142, 148. Each such paired inflow port 150 and outflow port 152 define respective endpoints of a passage 154 through the rotary valve shaft 120. As illustrated, the inflow port 150 has a larger perimeter than the outflow port 152, and the inflow port 150 and outflow port 152 define between them a right angle having a vertex at the centre of rotation of the rotary valve shaft 120. Making the width of these outflow ports 152 narrower than the width of the output ports 136 will produce a rotary cut-of mechanism that will resist material buildup and contamination of material between the rotary valve shaft 120 and the shell 130. In other words, only when the rotary valve shaft 120 is in deposition position, with these outflow ports 152 cleanly aligned with the output ports 136, will the respective inflow ports 150 be so aligned with respective piston plates 144 to direct accept and direct material from respective volumetric pocket 156 under the urging of the respective piston plates 144 through the passage 154 then cleanly out through outflows port 152 and output ports 136, to be deposited as portioned product.

With the rotary valve shaft 120 in the intake position, each inflow port 150 is open to the hopper 104 through the input ports 134 in the shell 130, such that material in the hopper 104 may flow through the corresponding passage 154 in the rotary valve shaft 120 and out the corresponding outflow port 152 into a volumetric pocket 156 defined between the rotary valve shaft 120, the piston shaft 118, the internal contour 146 of the shell 130, the respective opposing annular spacers 142 and the respective one of the piston plates 144 that extends between them. The piston shaft 118 is operable to rotate the respective one of the piston plates 144 away from the outflow port 152 to increase the volume of the volumetric pocket 156 to a desired amount and to create a vacuum in the volumetric pocket 156 to better draw in the material from the hopper 104.

FIGS. 12-15 show the piston shaft 118 and the rotary valve shaft 120 in isolation from the rest of the rotary piston depositor 100, with the rotary valve shaft 120 in a deposition position.

With the rotary valve shaft 120 in the deposition position, each inflow port 150 is open to the volumetric pocket 156 and the corresponding outflow port 152 is open to the output ports 136 in the shell 130. The piston shaft 118 is operable to rotate the respective piston plates 144 toward the inflow port 150 to decrease the volume of the volumetric pocket 156 and hence press the desired volume of material through the passage 154 and out of the rotary piston depositor 100, for deposit in production.

Those skilled in the art will recognize that when the rotary valve shaft 120 is in the deposition position, the chamber 128 is sealed from the hopper 104 and the input ports 134 of the chamber 128 are submerged below remaining material in the hopper 104, which material will resist the introduction of ambient air into the chamber 128 when the rotary valve shaft 120 subsequently returns to the intake position.

Those skilled in the art will appreciate that various matched sets of annular spacers 142, piston plates 144 and a rotary valve shaft 120 with the corresponding number of inflow ports 150, outflow ports 152 and passages 154 may be provided, assembled or deployed to allow a user to divide the chamber 128 into desired numbers of volumetric pockets 156, herein illustrated as six volumetric pockets 156.

Those skilled in the art will further appreciate that further stages might be added to the rotary piston depositor 100, for example nozzles, including rotary nozzles, or hoses connected to the output ports 136.

For example, FIGS. 16-20 show a cut-off valve attachment 158, having an attachment housing 160 easily attachable to the chamber housing 106, for example without tools, by at least one attachment quick-coupler 162. The attachment housing 160 houses a cut-off valve shaft 164, rotatable via a cut-off valve drive 166, for example rotatable through a 90 degree angle in synchronization with the piston shaft 118 and the rotary valve shaft 120.

(b) Operation of Specific Embodiments

With reference now to FIGS. 1-20, the operation of these specific embodiments of the invention will now be described.

Disassembly/Cleaning/Configuration/Assembly

To disassemble the rotary piston depositor 100 for cleaning or configuration/reconfiguration, a user would remove the hopper bolts 114, release the hopper 104 from the hopper lugs 110 and hopper pins 112, and remove the hopper 104 from the piston mechanism 102.

The user would then remove the tension knobs 116 and one of the endplates 132 from the cantilever arms 108, thus more fully exposing the components that reside within the chamber 128, including the piston shaft 118, rotary valve shaft 120, bushings 140, annular spacers 142 and piston plates 144, all of which can be removed by hand without tools for cleaning, service or reconfiguration. For example, a different matched set of a rotary valve shaft 120, annular spacers 142 and piston plates 144 may be used to replace those removed, so as to provide a different number of volumetric pockets 156 within the chamber 128. Finally, by holding the grips 138, the user may remove the shell 130 from the cantilever arms 108, These components can be reassembled in the opposite order as the disassembly described above.

Those skilled in the art will appreciate that these arrangements and configurations offer an ease of conducting a full wash down for food safety, noting that the limited number of food-contact parts can be easily disassembled, cleaned and reassembled by a person without tools or specialized training or skills.

Production

In production, the rotary valve shaft 120 is driven by the actuator 126 to rotate between the intake position and the deposition position. In synchronization with the rotary valve shaft 120, the piston shaft 118 is driven to rotate the piston plates 144 to draw material from the hopper 104 through the passage 154 in the rotary valve shaft 120 into volumetric pockets 156 to a desired volume and then to deposit that material from the volumetric pockets 156 through the passage 154 in the rotary valve shaft 120 through the output ports 136 to be deposited in production. This movement can be much gentler on the feed material and can be cycled at a higher frequency than is generally the case for linear piston depositors.

Because the annular spacers 142 sealingly urge against the internal contour 146 of the shell 130 and 148 the rotary valve shaft 120 to resist passage of the feed material, the intake vacuum, deposition pressure and volume for each volumetric pocket 156 is more predictable and reliable than conventional roller and common manifold approaches provide, thereby yielding more precise and accurate control of deposit volume of material. Furthermore, because the piston shaft 118, the piston plates 144 and the annular spacers 142 are all submerged within the material, with material occupying the chamber 128 on both sides of the piston plates 144 and both sides of the intermediate annular spacers 142, there is an equilibrium that reduces or removes the need for additional seals and reduces the likelihood of air pockets being drawn into the product.

Thicker, more viscous, less flowable material may be more challenging to process, resisting easy gravity flow. To better maintain vacuum and resist drawing in air, it may be helpful to attach a further stage to the output ports 136, such as the cut-off valve attachment 158.

It has been found that the teachings herein lead to gentle handling of the material being deposited, which is a factor in product integrity. In other words, material such as muffin batter containing chocolate chips, frozen blueberries or other semi-soft inclusions can be drawn from the hopper 104 and be deposited without damaging these inclusions. If these inclusions were to get damaged, it could lead to these inclusion "bleeding" into the batter which causes undesirable results for the products and end consumer.

Additionally, there are products that contain a high percentage of air, for example aerated products such as mousses. It is crucial that the equipment being used to produce these products do so gently so that during the depositing/filling process, air will not be lost from the product by over-processing, which can result in an inferior and most likely, unusable product.

Among the teachings herein that yield these benefits are the straight and simple flow path for material through the rotary piston depositor 100 and equilibrium provided by the piston shaft 118 and piston plates 144 being submerged within the material, with material occupying the chamber 128 on both sides of the piston plates 144.

Those skilled in the art will recognize that proper handling of the material and production of the product, including deposition of precise and accurate amounts, is improved by purging the rotary piston depositor 100 of air, whether upon start-up of a new batch or in recovery from a mid-batch incursion of air, and will recognize that such purging might be accomplished by running a sacrificial purging batch of material through the rotary piston depositor 100 before production, including by operating the piston shaft 118 and the rotary valve shaft 120 with parameters selected to purge air instead of optimizing production.

(c) Description Summary

Thus, it will be seen from the foregoing embodiments and examples that there has been described a way to configure a rotary piston depositor to precisely deposit multiple flows of material simultaneously.

While specific embodiments of the invention have been described and illustrated, such embodiments should be considered illustrative of the invention only and not as limiting the invention.

It will be understood by those skilled in the art that various changes, modifications and substitutions can be made to the foregoing embodiments without departing from the principle and scope of the invention as claimed.

The invention claimed is:

1. An apparatus for depositing flowable material, comprising:
   a. a chamber housing that forms a shell having an internal contour, an input port for receiving the flowable material and an output port for depositing the flowable material,
   b. a rotary valve shaft within the shell adjacent the output port, the rotary valve shaft having an inflow port and an outflow port and being rotatable within the shell between a deposition position wherein the outflow port is in alignment with the output port and an intake position wherein the inflow port is in alignment with the input port, and
   c. a piston shaft within the shell between the input port and the rotary valve shaft and rotatable in synchronization with the rotary valve shaft, the piston shaft having at least one piston plate that radiates to the interior contour of the shell, such that the piston shaft and the rotary valve shaft form with the shell a volumetric pocket to receive the flowable material from the input port,
   wherein, when the rotary valve shaft is in the intake position, the piston shaft rotates to expand the volumetric pocket to draw in flowable material from the input port through the inflow port and the outflow port, and when the rotary valve shaft is in the deposition position, the piston shaft rotates to compress the volumetric pocket to urge flowable material from the volumetric pocket through the input port and the outflow port to the output port.

2. An apparatus as claimed in claim 1, further including at least one annular spacer that radiates from the piston shaft to the interior contour of the shell to divide the volumetric pocket into at least two volumetric pockets.

3. An apparatus as claimed in claim 2, wherein the rotary valve shaft has a respective inflow port and outflow port for each of the at least two volumetric pockets.

4. An apparatus as claimed in claim 2, wherein the piston shaft and the rotary valve shaft are removable from the chamber housing for cleaning.

5. An apparatus as claimed in claim 3, wherein the at least one piston plate and the at least one annular spacer are removable from the piston shaft for cleaning.

6. An apparatus as claimed in claim 2, wherein the at least one annular spacer has an arcuate notch configured to receive for rotation therewithin the rotary valve shaft.

7. An apparatus as claimed in claim 1, wherein the inflow port and the outflow port define between them a right angle.

8. An apparatus as claimed in claim 1, wherein the inflow port is larger than the outflow port.

9. An apparatus as claimed in claim 1, wherein the apparatus is adapted to be cantilevered above a production line.

10. An apparatus as claimed in claim 1, further including a cut-off valve attachment coupled to the output port.

\* \* \* \* \*